United States Patent
DeMarco et al.

(10) Patent No.: US 8,027,636 B2
(45) Date of Patent: Sep. 27, 2011

(54) MULTI-BAND WIRELESS REPEATER

(75) Inventors: Anthony DeMarco, Newport Beach, CA (US); Gregory Johnson, Aptos, CA (US)

(73) Assignee: Cellynx, Inc., Valencia, CA (US)

( * ) Notice: Subject to any disclaimer, the term of this patent is extended or adjusted under 35 U.S.C. 154(b) by 548 days.

(21) Appl. No.: 12/235,313

(22) Filed: Sep. 22, 2008

(65) Prior Publication Data

US 2010/0075596 A1    Mar. 25, 2010

(51) Int. Cl.
*H04Q 7/20* (2006.01)

(52) U.S. Cl. ............ 455/11.1; 455/7; 455/12.1; 455/15; 455/550.1; 455/422.1; 370/310; 370/315; 343/700 R; 343/702; 343/726; 343/728; 343/741; 375/211

(58) Field of Classification Search ............... 455/11.1, 455/7, 12.1, 15, 19, 23, 550.1, 557, 422.1, 455/403, 500, 517, 426.1, 426.2, 445; 370/310, 370/315, 316; 343/700 R, 702, 726, 728, 343/741, 742, 757, 764, 866; 375/211

See application file for complete search history.

(56) References Cited

U.S. PATENT DOCUMENTS

| | | | |
|---|---|---|---|
| 7,253,770 | B2 | 8/2007 | Yegin et al. |
| 2004/0110469 | A1 | 6/2004 | Judd et al. |
| 2005/0001779 | A1 | 1/2005 | Copeland et al. |
| 2005/0253769 | A1 | 11/2005 | Timofeev et al. |
| 2007/0069954 | A1 | 3/2007 | Kenoun et al. |
| 2007/0218951 | A1 | 9/2007 | Risheq et al. |
| 2008/0136736 | A1 | 6/2008 | Proctor et al. |
| 2009/0213021 | A1* | 8/2009 | Yun et al. ............ 343/726 |

FOREIGN PATENT DOCUMENTS

JP    2003110354 A  *  4/2003

\* cited by examiner

*Primary Examiner* — Keith Ferguson
(74) *Attorney, Agent, or Firm* — Fish & Associates, PC (57) ABSTRACT

Wireless repeaters comprising antennae having high electrical isolation are presented. Multi-band antennae are placed on opposing sides of a conductive ground plane to achieve high electrical isolation, preferably higher than 30 dB. The antennae are preferably placed at a distanced from the ground plane that is less than 0.5 wavelengths of a frequency associated with frequency bands to which the antennae are responsive. The presented antennae system reduces the minimum amount of isolation required for stable operation.

30 Claims, 6 Drawing Sheets

MULTI-BAND WIRELESS REPEATER

FIELD OF THE INVENTION

The field of the invention is wireless repeaters.

BACKGROUND

Individuals owning cell phones are well aware of signal loss, especially within buildings or other structures that can attenuate wireless signals. Signals can be boosted by the use of a wireless repeater responsive to the frequency bands used by the cell phones and nearby cell towers.

A cell phone wireless repeater can boost signals between a cell phone and a tower by receiving, amplifying, and retransmitting the signals. Such repeaters employ dual antennae where one antenna communicates with a cell tower while the other antenna communicates with the cell phone. The repeaters can greatly enhance cell phone operation within buildings where cell phone signals are attenuated by the building walls.

The antennae of a wireless repeater should preferably be electrically isolated from each other to prevent the antennae from interfering with each other. Known wireless repeaters achieve some level of electrical isolation by physically separated the antennae by some distance, on the order of a meter or more. Such repeaters are undesirable due to the unsightly separation of the antennae, the cabling, or the physical space requiring by the repeaters.

Some effort has been directed toward to resolving the undesirable characteristics of a wireless repeater. For example, U.S. patent publication 2008/0136736 titled "Multiple-Antenna Device Having an Isolation Element" filed on Dec. 11, 2007, to Proctor et al. describes a repeater having two shielded transceivers that provide electrical isolation between the transceivers. However, the approach taken by Proctor fails to provide sufficient electrical isolation between the antennae while also offering sufficient coverage by the antennae. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for wireless repeaters having antennae that are electrically isolated.

SUMMARY OF THE INVENTION

The present invention provides apparatus, systems and methods in which a wireless repeater comprises at least two multi-band antennae where the antennae are electrically isolated. In one aspect of the inventive subject matter, the multi-band antennae comprise multi-antenna loops where each loop is responsive to a frequency band. Preferably the loops each have a length corresponding to approximately one wavelength of a frequency in their respective bands. The antennae can be placed on opposing sides of a conductive ground plane. The configuration of the antennae and ground plane provides for an electrical isolation of preferably at least 30 dB among the antennae, and more preferably an electrical isolation of at least 45 dB. Contemplated repeaters support frequency bands of 1710-2170 MHz and 824-960 MHz. Unless a contrary intent is apparent from the context, all ranges recited herein are inclusive of their endpoints, and open-ended ranges should be interpreted to include only commercially practical values.

Another aspect of the inventive subject matter includes a wireless repeater having a first and a second antenna responsive a single frequency band. Each of the antennae preferably comprises an antenna loop dimensioned to have a length of approximately one wavelength of a frequency within the band. In a preferred embodiment, the antennae are electrically isolated by at least 30 dB and are separated by a conductive ground plane.

In yet another aspect, the inventive subject matter includes methods of providing a wireless repeater. Multiple antennae, each comprising a one-wavelength antenna loop responsive to a frequency band, are placed on opposing sides of a conductive ground plane. An electrical isolation of at least 30 dB between the antennae is achieved by placing the antenna close to the ground plane. In a preferred embodiment, the antennae are spaced from the ground plane by a distance that is less than one half of a wavelength of a frequency within the frequency band.

Various objects, features, aspects and advantages of the inventive subject matter will become more apparent from the following detailed description of preferred embodiments, along with the accompanying drawings in which like numerals represent like components.

DETAILED DESCRIPTION

The following discussions with respect to the inventive subject present a wireless repeater having symmetry about a conducting ground plane. Although a preferred embodiment is approximately symmetric around the ground plane, it should be noted that asymmetric configurations are also contemplated. For example, a first antenna could include a one-wavelength antenna for communication with a cell tower while a second antenna could use a dipole antenna for communicating with device interior to a building.

Repeater Environment

Figure 1:
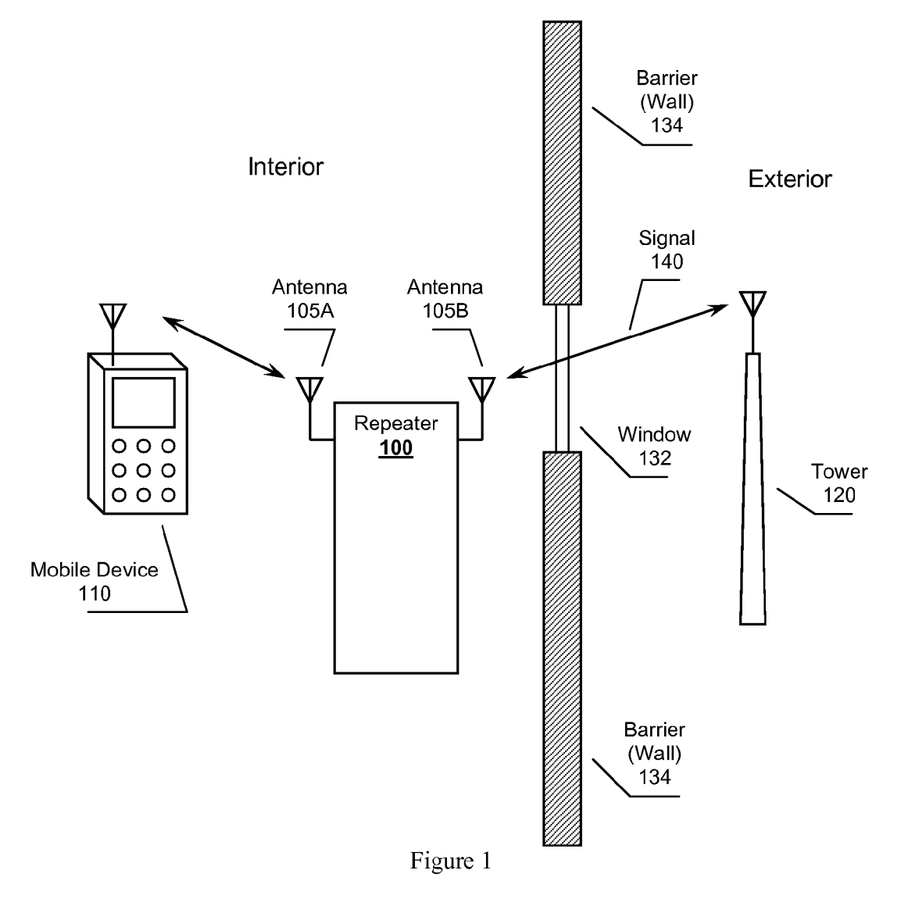
FIG. 1 illustrates the use of a wireless repeater.

In FIG. 1 wireless repeater 100 comprises antennae 105A and 105B. Antenna 105B receives signals 140 from cell tower 120. Repeater 100 amplifies signals 140 and retransmits the signals to mobile device 110. Preferably repeater 100 resides in a location allowing antenna 105B to receive signals 140 easily. For example, repeater 100 can be placed near window 132 that has less signal attenuation than barrier 134 (e.g., a building wall).

Mobile device 110 represents a wireless device capable of receiving wireless signals, preferably a cell phone. One skilled in the art will recognize that mobile device 110 can be numerous other devices beyond a cell phone including a game system, person data assistant, music player, video player, or other device that can communicate via wireless signals.

Repeater Overview

Figure 2:
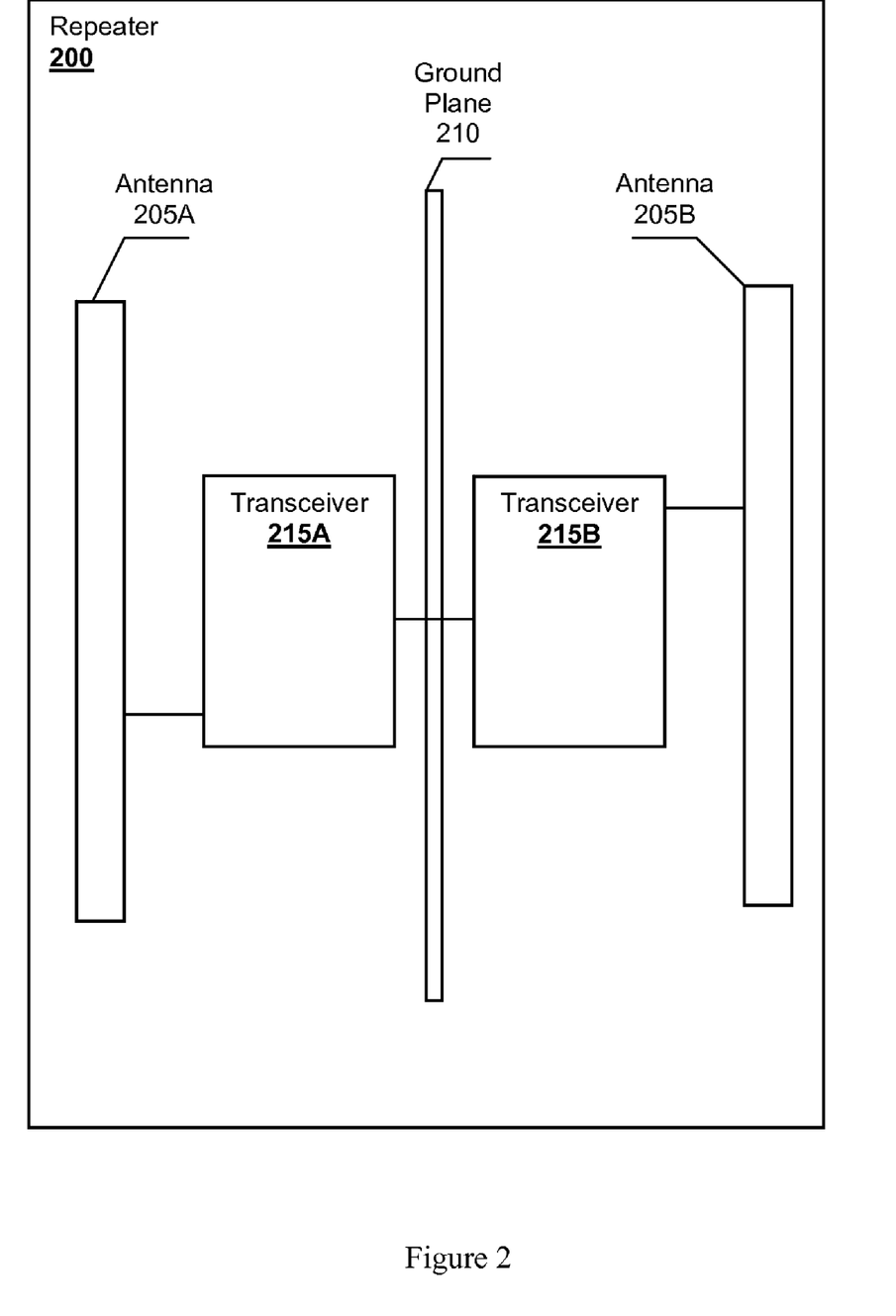
FIG. 2 is a schematic overview of a wireless repeater having multi-band antennae.

FIG. 2 illustrates an example repeater 200 comprising ground plane 210, antennae 205A and 205B, and transceivers 215A and 215B. In a preferred embodiment, antennae 205A and 205B are in electrical communication with transceivers 215A and 215B, respectively, which can be placed within conductive shielding. When antenna 205B receives electromagnetic signals, antenna 205B passes the signals to corresponding transceiver 215B. Transceiver 215B can amplify the signals and pass the signals through conductive ground plane 210 to transceiver 215A. Transceiver 215A can also amplify the signals and cause antenna 205A to emit the amplified signal. One skilled in the art will recognize that signals can also pass through repeater 200 from antenna 205A to 205B in a similar fashion.

Antennae 205A and 205B are preferably collocated in near proximity to ground plane 210 of repeater 200 and have an electrical isolation of at least 15 dB. In a preferred embodiment, antennae 205A and 205B are disposed within a common housing of repeater 200 along with ground plane 210. The common housing also preferably encloses transceivers 215A and 215B. Such a repeater provides for a compact product that can be deployed within a building and that can have an aesthetically pleasing construction. It is also contemplated that antennae 205A and 205B could be placed external to repeater 200. For example, antennae 205A and 205B can be mounted on the housing of repeater 200 or near (e.g., within 60 cm) repeater 200. Antennae 205A and 205B having high electrical isolation allows the antennae to be placed in or near repeater 200 by reducing or even eliminating a need for long coax cable connections or additional conduction shielding other than ground plane 210.

Antenna Configurations

Figure 3A:
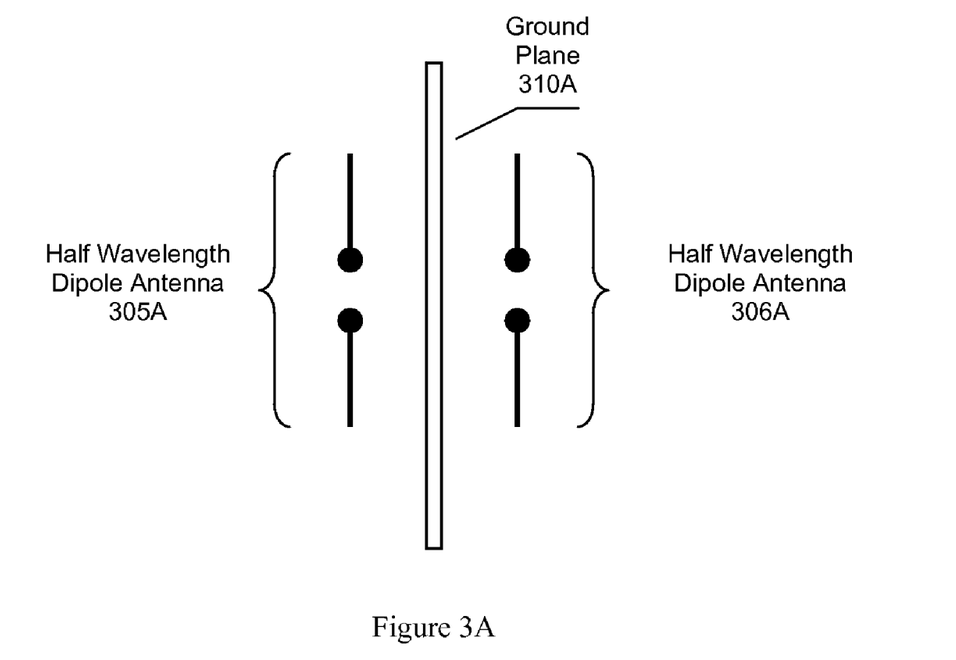
FIG. 3A is a schematic overview of an antennae arrangement of a wireless repeater where the antennae are half-wavelength dipole antennae.
Figure 3B:
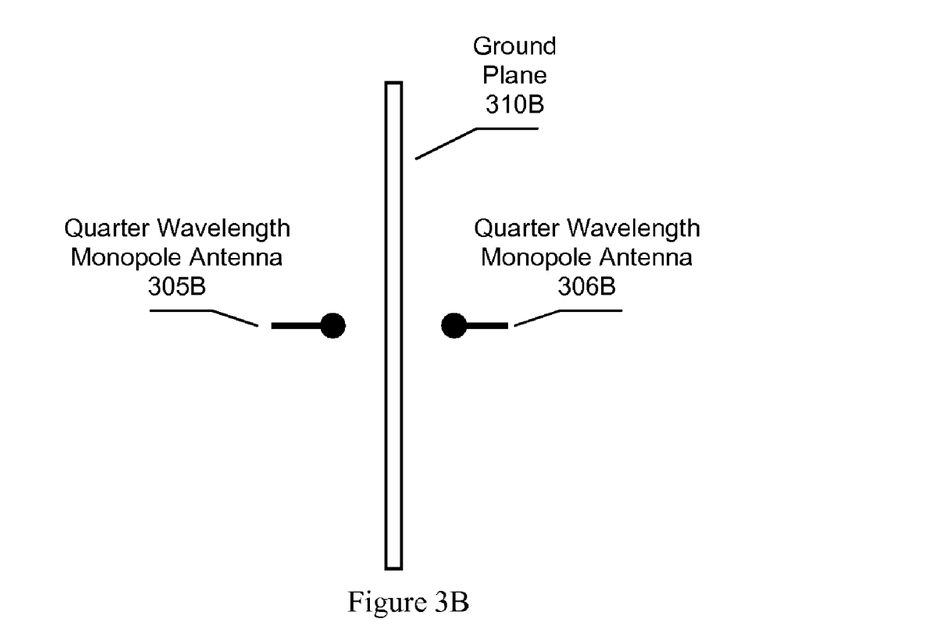
FIG. 3B is a schematic overview of an antennae arrangement of a wireless repeater where the antennae are quarter-wavelength monopole antennae.
Figure 3C:
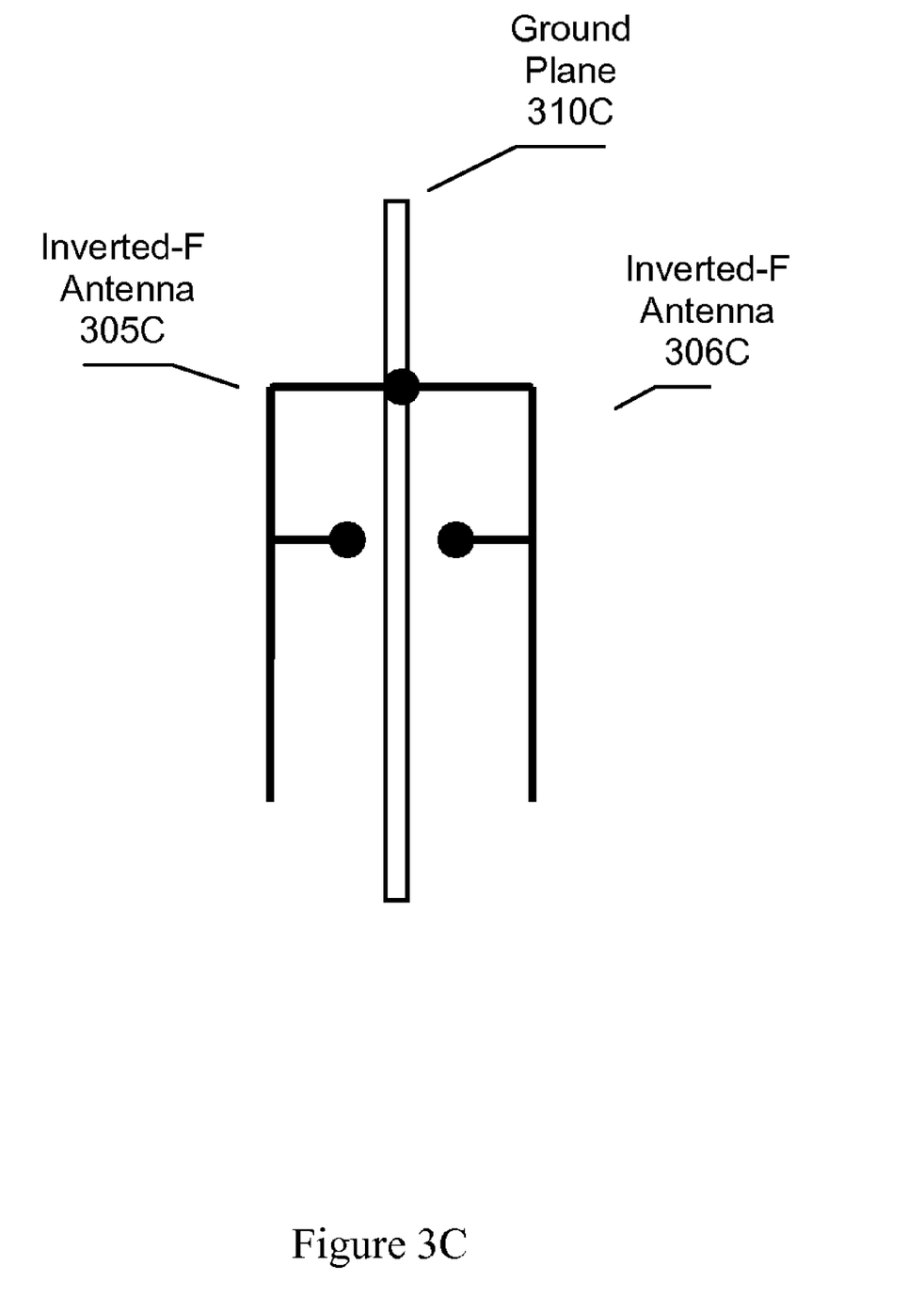
FIG. 3C is a schematic overview of an antennae arrangement of a wireless repeater where the antennae are inverted-F antennae.

FIGS. 3A, 3B, and 3C illustrate various embodiments of antennae configurations that can be utilized within a repeater. In FIG. 3A, antenna 305A and 306A represent half-wavelength dipole antenna disposed on opposite sides of conductive ground plane 310A. In FIG. 3B, antenna 305B and 306B represent quarter-wavelength monopole antenna separated by conductive ground plane 310B. In yet another embodiment, in FIG. 3C, antennae 305C and 306C are invented-F antennae placed on opposite sides of ground plane 310C. The preceding configurations can be used in a repeater where electrical isolation between the antennae is about 15 dB.

In a more preferred embodiment, a repeater includes antennae offering high gain while also offering greater electrical isolation than those illustrated in FIGS. 3A, 3B, and 3C. An acceptable high gain antenna preferably includes a one-wavelength antenna having a high gain of at least 3 dBi, and more preferably at least 8 dBi. A high gain one-wavelength antenna provides for improved signal-to-noise ratio for receivers, which can improve reception quality. Additionally, repeaters employing a high gain one-wavelength loop antenna have additional extended communication range than would ordinarily be accomplished with the configurations of FIGS. 3A, 3B, and 3C. Additional benefits are also realized from using one-wavelength. One benefit includes that the high gain of the antennae reduces the minimum isolation necessary between the two antennae because the amplifier gain used in the transceivers is reduced by the amount of the antenna gain. Another benefit includes allowing the antenna to be placed physically closer together, reducing the physical foot print of the overall repeater.

Figure 4:
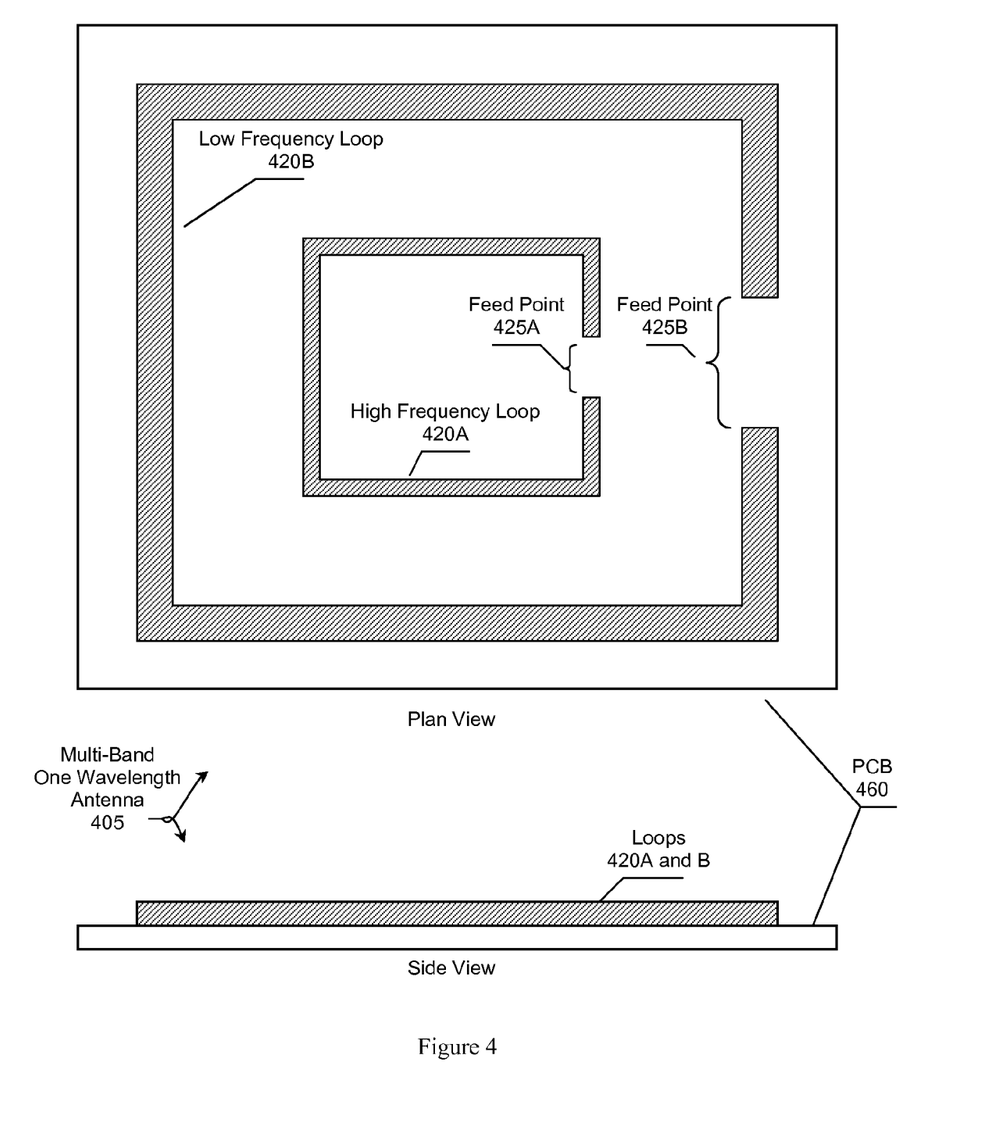
FIG. 4 is a schematic of a multi-band one-wavelength antenna.

FIG. 4 presents a plan view and a side view of a one-wavelength antenna 405 configured to operate as multi-band one-wavelength loop antenna having multiple antennae loops 420A and 420B. In the example show, antenna 405 includes a low frequency loop 420A and a high frequency loop 420B. Each loop 420A and 420B also comprise feed points 425A and 425B respectively. Feed points 425A and 425B can be acceptably connected to transceivers through a coaxial cable of 50 ohms impedance without requiring matching components. Although FIG. 4 illustrates an example of antenna 405 having two antennae loops, it should be noted that antennae having a single loop or more than two loops are also contemplated.

Loops are configured to be responsive to different frequency bands. Each loop has a smaller, inner perimeter that corresponds to a wavelength of the high-end frequency of the band and a larger, outer perimeter that corresponds to a wavelength of the lower-end frequency of the band. For example, high frequency loop 452A can be configured to receive and transmit frequencies in the band from 1710 MHz to 2170 MHz. For such a loop, the smaller inner perimeter would be approximately 13.8 cm for the wavelength of the frequency 2170 MHz, and the larger outer perimeter would be approximately 17.5 cm for the wavelength of the frequency 1710 MHz. It should be appreciated the previous values assume ideal materials or condition. Those skilled in the art will appreciate the lengths, shapes, or other parameters of the loops can be adjusted as necessary to fit the materials or methods used to manufacture antenna 405.

Antenna 405 can be manufactured using suitable known techniques. As shown, antenna 405 comprises loops 402A and 420B that are traces on PCB 460. The physical traces can comprise any suitable material, preferably comprising copper. The loop traces can be sized and dimensioned as necessary to respond to the desired frequency bands. Although the loops are shown as approximately square, other shapes are also contemplated including circular, oval, rectangle, or other shapes. In a preferred embodiment, loops 420A and 420B are coplanar, preferably nested, and formed on a common side of PCB 460 to reduce manufacturing time. In addition loops 420A and 420B are preferably concentric to reduce the over all foot print of antenna 405.

In an alternative embodiment, antenna 405 can comprises one or more wire loops. For example, loops 420A and 420B can be formed from a wire conductor. Furthermore, the wire conductor can comprises spring wire in a manner where each loop represents a spring within a repeater and is held in place by the tension of the springs.

In a preferred embodiment, a low frequency loop is configured to be responsive to a band of frequencies from approximately 824 MHz to 960 MHz, and more preferably from 824 MHz to 894 MHz to provide signal coverage for GSM or other cellular bands. Furthermore, a preferred embodiment has a high frequency loop configured to be responsive to a band of frequencies from approximately from 1710 MHz to 2170 MHz, and more preferably from 1850 MHz to 1990 MHz, to provide signal coverage for 3G, 4G, or other similar bands.

Once multi-band antenna 405 is constructed, it is preferably capable of providing a beam width sufficient to cover an interior of a building. The beam width of antenna 405 is preferably between 70 degrees and 120 degrees, and more preferably between 90 degrees and 105 degrees. These beam widths provide coverage for a large interior space within a building as well as increase the likelihood of communication with an exterior cell tower or other signal source.

Wireless Repeater

Figure 5:
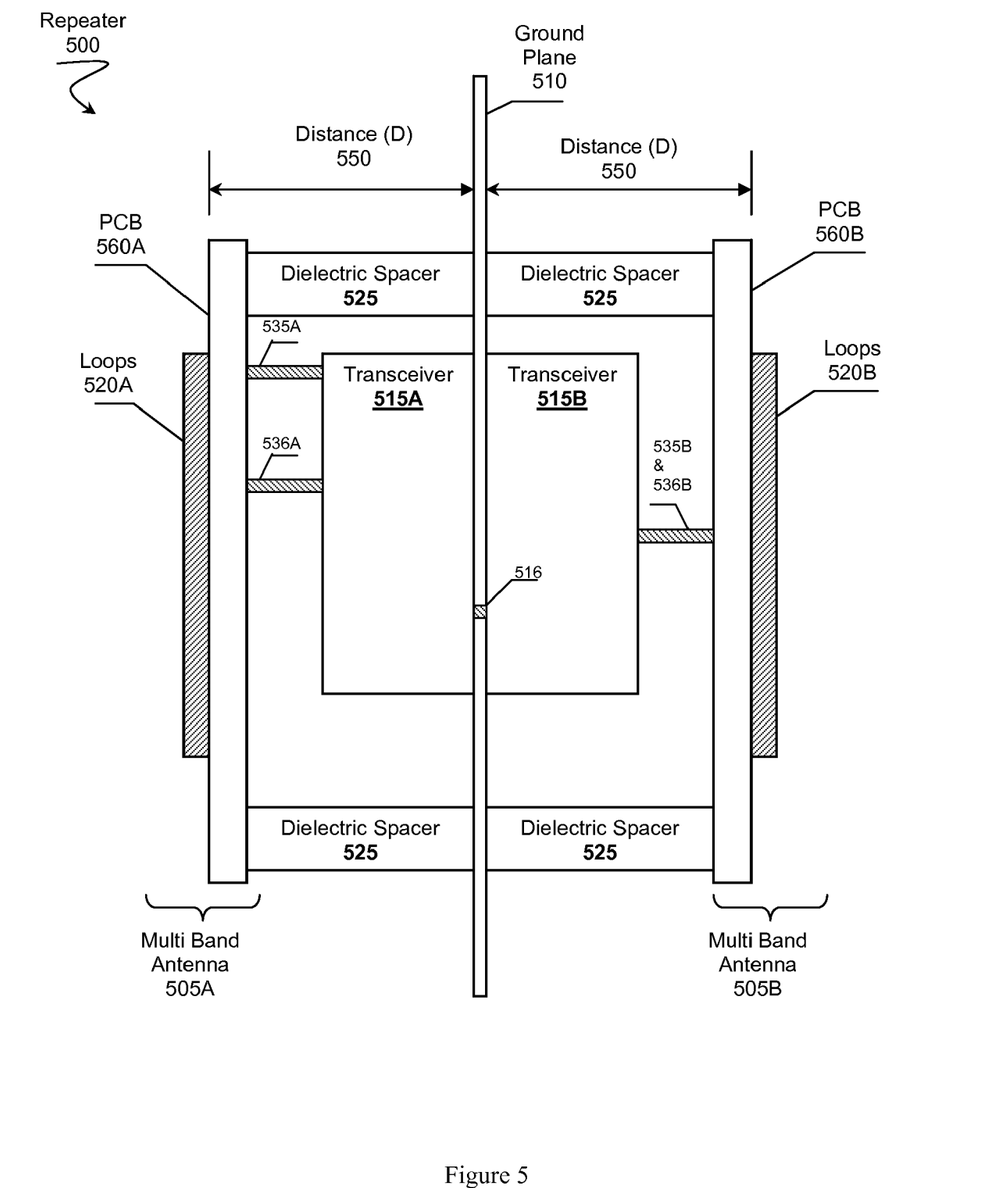
FIG. 5 is a schematic of a wireless repeater having one-wavelength antennae displaced from a ground plane.

In FIG. 5, repeater 500 represents a preferred embodiment comprising transceiver 515A and multi-band antenna 505A separated by conductive ground plane 510 from transceiver 515B and multi-band antenna 505B. Transceivers 515A and 515B are in electrical communication with each other via connection 516, preferably via coaxial cable, through ground plane 510. Antenna 505A and 505B can comprise loops 520A and 520B on PCBs 560A and 560B, respectively, as previously described.

Both antenna 505A and 505B are spaced from conductive plane 510 by one or more dielectric spacers 525 by a distance 550 to achieve high electrical isolation. An appropriate distance 550 for an isolation of 30 dB is preferably less than 0.5 wavelengths of a frequency within the frequency bands to which the antennae are responsive. In some embodiments, distance 550 is determined from a frequency associated with the lower frequency band. It is also contemplated that loops 520A and 520B can each individually be placed at different distances according to their respective bands resulting in a non-coplanar configuration. In a more prefer embodiment, distance 550 is between 0.02 and 0.25 wavelengths. In yet a more preferred embodiment, distance 550 is about 0.064 wavelengths which can achieve an electrical isolation of at least 45 dB.

It should be noted that the inventive subject matter also includes the concept of tuning antennae 505A or 505B, or loops 520A or 520B for electrical isolation by adjusting the distance 550 for each of the components. In a preferred embodiment, distance 550 is adjusted at manufacturing time to achieve an electrical isolation of at least 30 dB between antennae 505A and 505B by spacing each antennae or each of the loops at distances of ground plane 510 where the distances are no more than 0.5 wavelengths of a frequency within a frequency band associated with antenna 505A or 505B.

Dielectric spacers 525 could be removed from repeater 500 when alternative forms of antenna 505A or 505B are used. For example, in embodiment where loops 520A or 520B comprises conductive wire springs, the springs can hold themselves in place at an appropriate distance.

Additionally, the antennae are electrically coupled to their respective transreceivers; preferably via coax feed lines 535A, 536A, 535B, and 536B. For example, antenna 505A can couple to transceiver 515A by connecting its low frequency loop via coupling 535A and its high frequency loop via coupling 536A. In a similar manner vein, loops 520B couple to transceiver 515B via couplings 535B and 536B. As shown in FIG. 5, feed points on the antennae loops 520A and 520B are preferably oriented approximately 90 degrees from each other to cause the antennae to be cross-polarized which further increases the electrical isolation between the antennae. Coaxial feed lines 535A, 536A, 535B, and 536B can be perpendicular to the plane of the antennae loops 520A or 520B in each antenna 505A or 505B. In some embodiments, ferrite material can be placed around the coax lines to reduce potential radio frequency radiation from the coax lines.

Conductive ground plane 510 is preferably constructed to have dimension suitable for producing a repeater product that can be deployed in a consumer, SMB, or SOHO environment. A preferred conducting ground plane has dimensions on the order of 20 cm by 20 cm which allows for a compact product. For example in some compact embodiments, antenna 505A is physically separated from antenna 505B by less than 10 cm even though they two antennae are also separated by ground plane 510.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A wireless repeater, comprising:
    a first and a second multi-band antenna each comprising a first antenna loop responsive to a first band of frequencies and a second antenna loop responsive to a second, different band of frequencies, and each loop has a length of approximately one wavelength of a frequency within their respective bands;
    a first transceiver electrically coupled to the first antenna;
    a second transceiver electrically coupled to the second antenna;
    a conductive ground plane separating (a) the first antenna and the first transceiver from (b) the second antenna and the second transceiver where each of the first and the second multi-band antenna are physically spaced from the conductive ground plane by distances of less than 0.5 wavelengths of a frequency associated with at least one of the first and the second frequency bands;
    wherein the first multi-band antenna is electrically isolated from the second multi-band antenna by at least 30 dB; and
    wherein the first and the second transceiver are in electrical communication through the conductive ground plane.

2. The repeater of claim 1, wherein the first multi-band antenna is electrically isolated from the second multi-band antenna by at least 45 dB.

3. The repeater of claim 1, further comprising a common housing in which is disposed the first multi-band antenna, the second multi-band antenna, and the conductive ground plane.

4. The repeater of claim 3, wherein the first and the second transceivers are disposed within the common housing.

5. The repeater of claim 1, wherein the first and the second multi-band antenna are physically separated by less than about 10 cm.

6. The repeater of claim 1, wherein the first loop of the first antenna is responsive to a high frequency band and the second loop of the first antenna is responsive to a low frequency band, and where the first loop is concentric with the second loop.

7. The repeater of claim 6, wherein the first loop is responsive to frequencies from 1710 MHz to 2170 MHz, inclusively.

8. The repeater of claim 7, wherein the first loop is response to frequencies from 1850 MHz to 1990 MHz, inclusively.

9. The repeater of claim 6, wherein the second loop is responsive to frequencies from 824 MHz to 960 MHz, inclusively.

10. The repeater of claim 9, wherein the second loop is responsive to frequencies from 824 MHz to 894 MHz, inclusively.

11. The repeater of claim 6, wherein the first loop and the second loop are physically separated by different distances from the ground plane.

12. The repeater of claim 1, wherein the first and the second antenna loops of the first antenna comprise traces disposed on a common side of a PCB.

13. The repeater of claim 1, wherein the first and the second antenna loops of the first antenna comprise self-supporting conducting wires.

14. The repeater of claim 13, wherein the loops comprise springs.

15. The repeater of claim 1, further comprising dielectric spacers separating the conductive ground plane from the first and the second multi-band antenna.

16. The repeater of claim 1, wherein the first and the second multi-band antenna are cross-polarized with respect to each other.

17. The repeater of claim 1, wherein the first and the second antenna loops of the first multi-band antenna are nested and coplanar.

18. The repeater of claim 1, wherein the first multi-band antenna has a beam width of between 70 degrees to 120 degrees, inclusively.

19. The repeater of claim 18, wherein the beam width is between 90 degrees and 105 degrees inclusively.

20. The repeater of claim 1, wherein the distances are in the range of 0.02 to 0.25 wavelengths of the frequency associated with at least one of the first and the second frequency bands.

21. The repeater of claim 20, wherein the distances are about 0.064 wavelengths of the frequency associated with at least one of the first and the second frequency bands.

22. A wireless repeater, comprising:
a first and a second antenna where each comprising an antenna loop responsive to a band of frequencies and the loop has a length of approximately one wavelength of a frequency within the band;
a first transceiver electrically coupled to the first antenna;
a second transceiver electrically coupled to the second antenna;
a conductive ground plane separating (a) the first antenna and the first transceiver from (b) the second antenna and the second transceiver where the first and the second antenna are physically spaced from the conductive ground plane by distances of less than 0.5 wavelengths of a frequency associated with the frequency band;
wherein the first antenna is electrically isolated from the second antenna by at least 30 dB; and
wherein the first and the second transceiver are in electrical communication through the conductive ground plane.

23. The repeater of claim 22, wherein the first antenna is electrically isolated from the second antenna by at least 45 dB.

24. The repeater of claim 22, wherein the antenna loop of the first antenna comprises traces disposed on a PCB.

25. The repeater of claim 22, wherein the antenna loop of the first antenna comprises self-supporting conducting wires.

26. The repeater of claim 22, wherein the first antenna has a beam width of between 70 degrees to 120 degrees, inclusively.

27. The repeater of claim 26, wherein the beam width is between 90 degrees and 105 degrees inclusively.

28. The repeater of claim 22, wherein the distances are in the range from 0.02 to 0.25 wavelengths of the frequency associated with the frequency band.

29. The repeater of claim 28 wherein the distances are about 0.064 wavelengths of the frequency associated with the frequency band.

30. A method of providing a wireless repeater, the method comprising:
obtaining a conductive ground plane having a first and a second side;
obtaining a first and a second antenna each comprising an antenna loop having a length of approximately one wavelength of a first frequency within a frequency band; and
achieving an electrical isolation of at least 30 dB between the first and the second antenna of by:
(a) spacing the first antenna within 0.5 wavelengths of a second frequency within the frequency band on the first side of the conducting ground plane;
(b) spacing the second antenna within 0.5 wavelengths of the second frequency on the second side of the conducting ground plane; and
(c) coupling the first antenna to the second antenna through the ground plane via transceivers that are also separated by the ground plane.

* * * * *